May 19, 1931.   E. G. THOMAS   1,806,132
COUNTING SCALE
Filed Dec. 29, 1920   2 Sheets-Sheet 1
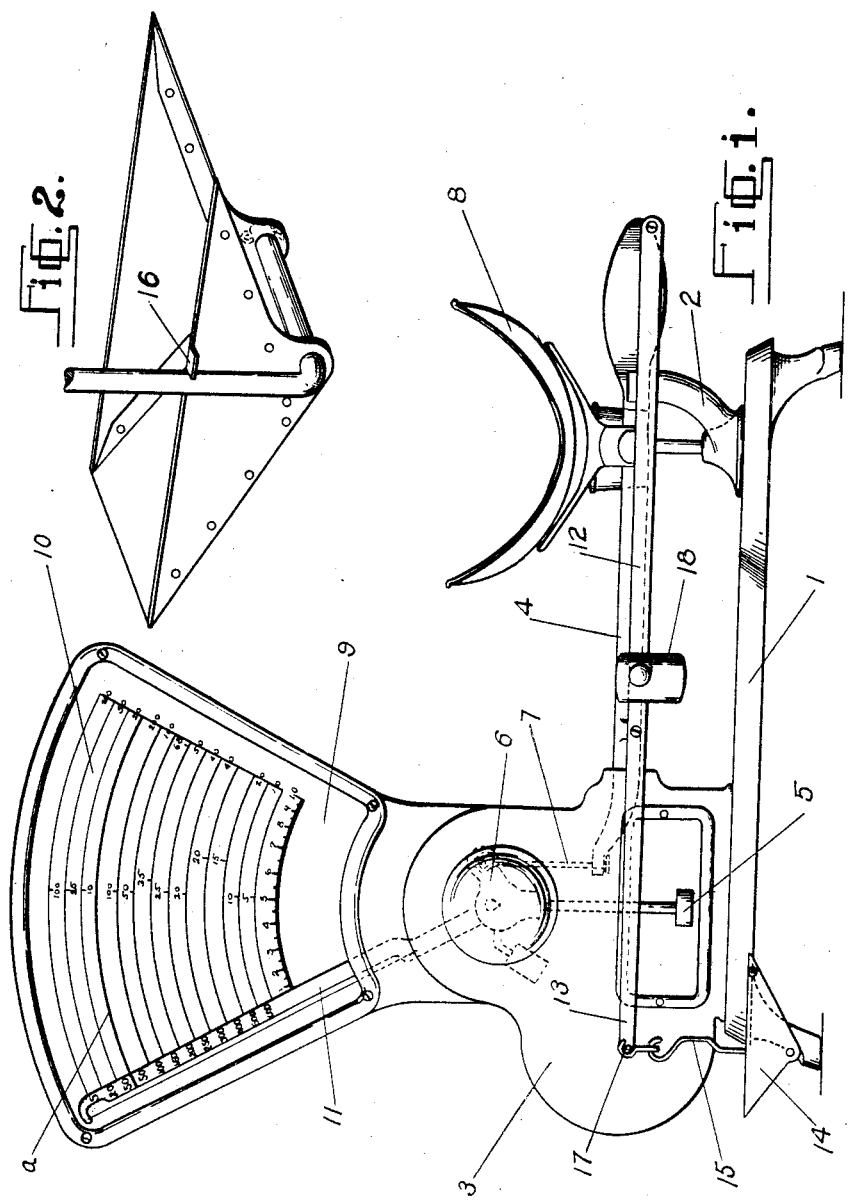
Edward G. Thomas, Inventor
By C. C. Marshall, Attorney May 19, 1931.  E. G. THOMAS  1,806,132
COUNTING SCALE
Filed Dec. 29, 1920  2 Sheets-Sheet 2

Inventor
EDWARD G. THOMAS.
By CO Marshall Attorney

Patented May 19, 1931

1,806,132

UNITED STATES PATENT OFFICE

EDWARD G. THOMAS, OF TOLEDO, OHIO, ASSIGNOR TO TOLEDO SCALE MANUFACTURING COMPANY, OF TOLEDO, OHIO, A CORPORATION OF NEW JERSEY

COUNTING SCALE

Application filed December 29, 1920. Serial No. 433,921.

This invention is designed for use in manufacturers' stock rooms, hardware stores, etc., and relates to a method for quickly and accurately issuing definite numbers or counts of small articles, such as screws and machine parts, by weight instead of by actual count, and to apparatus employed in practising the said method, the apparatus consisting of a novel scale adapted to be used for weighing out definite numbers of articles in lieu of counting them.

One of the principal objects of the invention is to provide means for quickly and accurately securing definite counts of a great variety of small articles.

Another object is to provide a machine capable of automatically indicating such counts and having a wide range in relation to the sizes of parts which it can handle. I accomplish this object by providing a scale having an indicator co-operating with a chart having a graduation corresponding to the weight of a definite number of articles of each type with an index number for each graduation. The graduation to which a given number of articles of a particular type will bring the indicator is determined and the number of such graduation is assigned as an index number to that particular type of article.

Another object of the invention is to provide means for quickly ascertaining the proper index numbers for articles to be counted.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a front elevation of a scale embodying my invention;

Figure 2 is an enlarged perspective view of a specimen pan employed in the form of my device illustrated in Figure 1.

Figure 3:
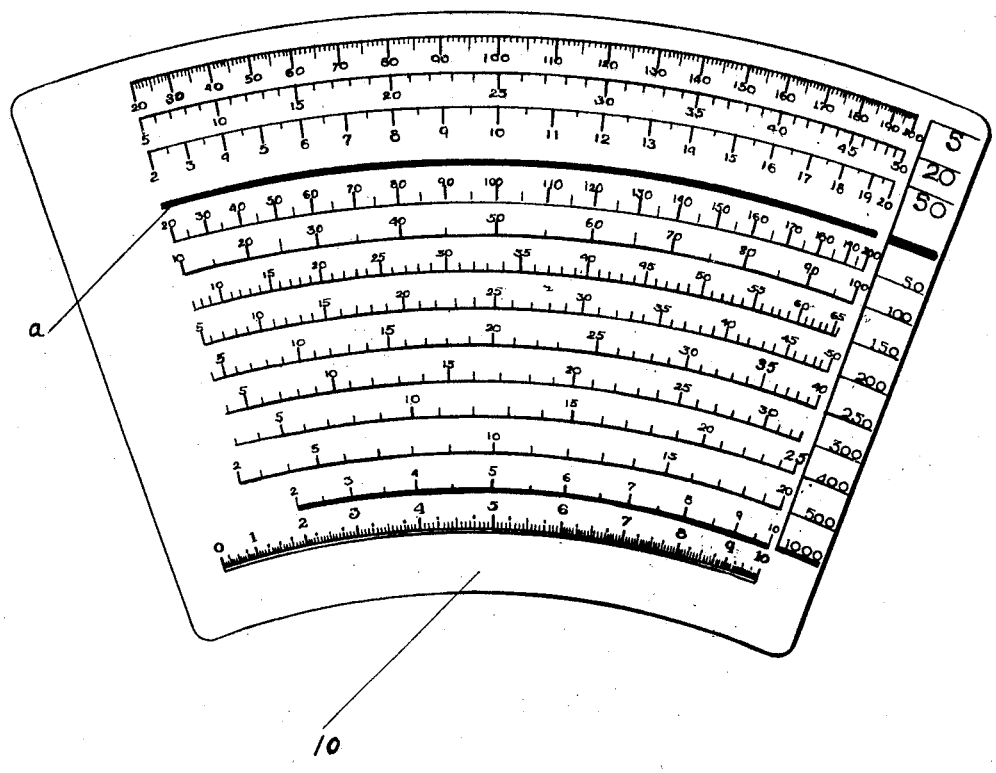
Figure 3 is an enlarged detail view of the chart, showing a preferred arrangement of the index graduations.

For illustrative purposes I have shown the apparatus of my invention as embodied in a pendulum scale having a stationary fan-shaped chart. It is to be understood, however, that this mechanism is exemplary only and that the invention may also be embodied in scales having other load-offsetting devices controlled by gravity, springs, or other means, and that it may also be embodied in scales having other forms of charts, either stationary or movable.

In the form shown, the base 1 of the scale is provided with a fulcrum stand or base horn 2 adjacent one end and supports an upright housing 3 at its other end. The main lever 4 of the scale is fulcrumed upon the base horn 2, with its free end or nose extending into the housing 3. Within the housing 3 is suspended a load-offsetting pendulum 5 having a laterally-extending arm 6 which is connected by means of a link 7 to the nose of the lever 4. A commodity-receiving scoop 8 is supported in the usual manner upon the load pivots of the lever 4. The parts of the scale so far described differ in no respect from those of the well-known fan type pendulum weighing scale, and I have therefore described them only in such detail as is necessary for a clear understanding of the relation to the parts now to be described.

Secured within the housing 3 and visible through a transparent face 9 thereof is a chart 10 adapted to co-operate with an indicator hand 11 which is rigidly secured to the pendulum 5 so that it moves over the chart as the pendulum is swung upwardly by a load on the commodity-receiver.

The chart is provided with a plurality of concentric rows of graduations, each row co-operating with the portion of the hand 11 which moves over it as the pendulum swings. The lowermost row of graduations represents pounds and ounces, so that the weight of the load on the scoop 8 is indicated thereon by the hand 11 in the ordinary way.

Located between the rows of graduations third and fourth from the top of the chart is a heavy line *a*, and the portions of the hand 11 which co-operate respectively with the rows of graduations between the line *a* and the lowermost row are marked 50, 100, 150, 200, 250, 300, 400, 500, and 1000, the right side of the chart being similarly marked, as is clearly shown in Figure 3. Each graduation in the row marked 50, immediately below the line *a*, represents the position to which 50 articles of a given average weight will bring the hair line indicator of the hand 11. Each graduation in the "100" row represents the position to which 100 articles of a given average weight will bring the hand, etc. These graduations are progressively numbered from left to right with index figures to be assigned to various types of articles.

In order to determine the index figure to be assigned to a particular article, the graduation on one of the rows to which the corresponding number of such articles when placed on the scoop 8 will bring the hand is ascertained. For example, if the article be of such weight that 100 specimens in the scoop 8 will bring the indicator hand 11 into registration with the graduation numbered 10 on the row marked 100, the index figure of such article would be 10. The spacings of the graduations in the other rows are inversely proportional to the numbers designating the respective rows, and graduations in the other rows are therefore so arranged that 200 like articles in the scoop 8 will bring the indicator hand to the graduation numbered 10 in the "200" row, 500 articles will bring the hand to the graduation numbered 10 in the "500" row, etc. 10 is therefore considered the index figure of such article. In practice each bin or container is marked with the index figure of the article held thereby, and thereafter when a count of articles is to be issued or sold, a sufficient quantity is placed in the scoop to bring the indicator to the index figure of the article on the row of graduations corresponding to the count desired.

If, for example, two hundred and fifty specimens of an article having an index figure of 25 are desired, the scoop 8 is loaded until the portion of the indicator hand marked 250 registers with the graduation numbered 25 in the corresponding row.

For the sake of clearness, the numbers of some of the graduations may be omitted. For example, every tenth graduation in the two rows immediately below the heavy line *a* and every fifth graduation in the next six rows may be numbered, the numbers of the intermediate graduations being evident from their positions.

The index figure for any article may, as stated, be ascertained by placing a count, such as fifty or a hundred specimens of the article, in the scoop 8 and noting the graduation indicated in the appropriate row. To manually count fifty or a hundred specimens of every type to be weighed out is, however, a somewhat inconvenient and time-consuming operation; so it is desirable to determine the index figure with a smaller number of parts. In order to obtain a comparatively great movement of the indicator hand with a smaller number of parts, I have provided the lever 4 with a beam 12 having an arm 13 extending beyond the nose of the lever and carrying a specimen pan 14. The pan 14, as shown, is pivoted upon a laterally-extending portion of a link 15 so that it may be tilted to the left to empty its contents into the operator's hand. Tilting to the right is prevented by a stop 16, and the center of mass of the pan is at the right of the pivotal axis, so that it normally remains in the position shown in Figures 1 and 2. The pivot 17 from which the specimen pan is hung is located at a distance from the fulcrum of the main lever 4, which is ten times the distance of the load pivot supporting the scoop 8 from the said fulcrum. Five articles in the specimen pan will therefore move the indicator 11 as far as fifty similar articles in the scoop.

For the purpose of directly indicating the index figures of articles so placed in the specimen pan, I have placed supplementary rows of graduations on the chart 10 above the heavy line *a*. The uppermost of these supplementary rows of graduations co-operates with a portion of the indicator hand which is marked 5. Since the hand moves to the same position when five specimens are placed in the specimen pan that it assumes when fifty similar articles are placed in the scoop, the graduations and index figures on this upper row are identical with respectively radially aligned graduations and numbers of the row marked 50. The second row of supplementary graduations co-operates with the portion of the hand marked 20, and its numbers and graduations are in radial alignment with identical rows and graduations in the row marked 200, while the third row co-operates with the portion of the hand marked 50, its graduations and numbers being in radial alignment with identical graduations and numbers in the row marked 500.

In using the specimen pan to find index figures for various articles, it is only necessary to place five, twenty, or fifty specimens of such articles in the pan. The index figure of the article in the pan is then automatically indicated on one of the supplementary rows of graduations by the hand 11, if five specimens are placed in the pan on the row marked 5, if twenty are placed in the pan on the row marked 20, and if fifty are placed in the pan on the row marked 50. In the case of very small articles it is well to use fifty specimens, and in the case of larger articles the index figure may be determined with sufficient accuracy by using five. Should the hand register with a point between graduations, the index number will terminate in a decimal fraction, as 28.5, 37.25, or 40.2.

Placing the index graduations on the chart and the count designations on the hand makes possible the use of a very large number of graduations, thereby permitting articles through a wide range of weights to be accurately counted. The range of the scale may be further expanded to count out parts which are of very light weight by placing the parts in the pan 14 rather than in the scoop 8 and thus causing the indicator to be swung a sufficient distance for reliable indication. In such case the index figure of the article is multiplied mentally by ten and the hand is brought to the multiple in the proper row of graduations on the chart. If, for example, it is desired to weigh out two hundred articles having an index figure 5, the hand is brought to 50 on the row of graduations marked 200. This operation is rendered possible by reason of the fact that the ratio of the lever arms of the scoop 8 and pan 14 is 1:10.

The index figures of the various articles will ordinarily be determined in advance by the foreman of the stock room or other responsible person and marked upon the bins in which the articles are kept. In some cases it may be convenient to employ a separate scale for determining the index figures to be assigned to the various articles, and it is to be understood that the use of such a separate scale is within the scope of this invention.

The scale may be equipped with a tare poise 18 slidably mounted on the beam 12 for use in ordinary weighing or to offset the weight of containers into which parts are to be counted.

While it will be apparent that the illustrated embodiment of my invention herein disclosed is well calculated to adequately fulfill the objects primarily stated, it is to be understood that the invention is susceptible to variations, modification and change within the spirit and scope of the subjoined claims.

Having described my invention, I claim:

1. In a device of the class described, in combination, a chart, and an indicator co-operating therewith, said chart having a plurality of rows of graduations designated by index numbers adapted to be assigned to articles of various weights, said indicator bearing a count designation for each row of graduations.

2. In a device of the class described, in combination, automatic load-offsetting mechanism, a commodity-receiver connected therewith, a ratio pan also connected therewith, and a chart and indicator co-operating with said automatic load-offsetting mechanism, said indicator having a portion bearing count designations for lots of articles placed in said ratio pan and a portion bearing count designations for lots of articles placed in said commodity-receiver, and said chart having a row of graduations for each count designation, said graduations being distinguished by index numbers adapted to be assigned to articles of various weights.

3. In a device of the class described, in combination, weighing mechanism, an indicator, a counting chart having a plurality of series of rows of graduations, each row in each series being designated by a number, the spacings of the graduations of like values in the rows of each series being proportional to the numbers designating the respective rows, the ratio of the spacings and designating number of each row being greater in one series than in the other and means operated by movement of said weighing mechanism for imparting relative movement of said indicator and counting chart.

4. In a device of the class described, in combination, weighing mechanism, an indicator, a counting chart having a plurality of series of rows of graduations, each row in each series being designated by a number, the spacings of the graduations of like values in the rows of each series being proportional to the numbers designating the respective rows, the ratio of the spacings and designating number of each row of one series being ten times that of the other and means operated by movement of said weighing mechanism for importing relative movement of said indicator and counting chart.

5. In a device of the class described, in combination, weighing mechanism, a counting chart having a series of rows of graduations, and an indicator bearing a designating number for each row of graduations, the spacings of the graduations of like values being proportional to the numbers designating the respective rows and means operated by movement of said weighing mechanism for imparting relative movement of said indicator and counting chart.

6. In a device of the class described, in combination, weighing mechanism, a counting chart having a plurality of series of rows of graduations, and an indicator having a designating number for each row in each series, the spacings of the graduations of like values in the rows of each series being proportional to the numbers designating the respective rows, the ratio of the spacings and designating number of each row being greater in one series than in the other and means operated by movement of said weighing mechanism for imparting relative movement of said indicator and counting chart.

7. In a device of the class described, in combination, weighing mechanism, a counting chart having a plurality of series of rows of graduations, and an indicator having a designating number for each row in each series, the spacings of the graduations of like values in the rows of each series being proportional to the numbers designating the respective rows, the ratio of the spacings of each row in one series being ten times that in the other for the same designating number and means operated by movement of said weighing mechanism for imparting relative movement of said indicator and counting chart.

EDWARD G. THOMAS.